(12) United States Patent
Brandstaetter (10) Patent No.: US 11,527,982 B2
(45) Date of Patent: Dec. 13, 2022

(54) LINEAR MOTOR SYSTEM

(71) Applicant: Schneider Electric Industries SAS, Rueil-Malmaison (FR)

(72) Inventor: Wolfgang Brandstaetter, Ettenheim (DE)

(73) Assignee: Schneider Electric Industries SAS, Rueil-Malmaison (FR)

(*) Notice: Subject to any disclaimer, the term of this patent is extended or adjusted under 35 U.S.C. 154(b) by 532 days.

(21) Appl. No.: 16/536,980

(22) Filed: Aug. 9, 2019

(65) Prior Publication Data

US 2020/0059187 A1 Feb. 20, 2020

(30) Foreign Application Priority Data

Aug. 17, 2018 (EP) .................... 18189508

(51) Int. Cl.
*H02K 1/14* (2006.01)
*H02K 41/03* (2006.01)
*H02P 25/06* (2016.01)

(52) U.S. Cl.
CPC .............. *H02P 25/06* (2013.01); *H02K 1/14* (2013.01); *H02K 41/031* (2013.01)

(58) Field of Classification Search
CPC ................................ H02K 41/03; H02K 1/14
USPC ................. 310/12.01, 12.22, 12.25
See application file for complete search history.

(56) References Cited

U.S. PATENT DOCUMENTS

| 3,771,033 | A | 11/1973 | Matsui et al. |
| 7,385,678 | B2 * | 6/2008 | Dams ............... G03B 27/58 355/75 |
| 2018/0159416 | A1 | 6/2018 | Julen et al. |

FOREIGN PATENT DOCUMENTS

| EP | 0 052 346 A2 | 5/1982 | |
| EP | 2 156 979 A1 | 2/2010 | |
| EP | 2156979 A1 * | 2/2010 | ............. B60L 13/03 |
| EP | 3 487 049 A1 | 5/2019 | |
| JP | 2003204667 A * | 7/2003 | |
| JP | 20044297971 A * | 10/2004 | |
| JP | 2012178955 A * | 9/2012 | |
| WO | WO 2016/202798 A1 | 12/2016 | |
| WO | WO-2016202798 A1 * | 12/2016 | ............. B60L 13/03 |

OTHER PUBLICATIONS

Machine Translate EP215697 (Year: 2010).*

(Continued)

*Primary Examiner* — Jose A Gonzalez Quinones
(74) *Attorney, Agent, or Firm* — Oblon, McClelland, Maier & Neustadt, L.L.P.

(57) ABSTRACT

A linear motor system comprises a plurality of stator elements that have one or more magnetic coils for generating a magnetic flux in the respective stator element and at least one mover that has at least one magnetic element that interacts with the magnetic coils of the stator elements. The mover is moved by means of activation of at least one stator element in a direction of movement relative to the stator elements. At least one selected stator element is configured to change with respect to the magnetic flux from a first state into a second state or to have the second state permanently while at least some of the other stator elements remain in the first state so that the selected stator element exerts a braking and/or holding force on the mover in the second state.

15 Claims, 11 Drawing Sheets

(56) References Cited

OTHER PUBLICATIONS

Extended European Search Report dated Nov. 16, 2018, in Patent Application No. 18189508.7, 12 pages (with English Translation of Category of Cited Documents).

* cited by examiner

LINEAR MOTOR SYSTEM

The present invention relates to a linear motor system having a plurality of stator elements that each comprise a magnetic coil for generating a magnetic flux in the respective stator element and having at least one mover, also known as a slider, that has at least one magnetic element that interacts with the magnetic coils of the stator elements and that is moved by means of activation of at least one stator element in a direction of movement relative to the stator elements.

Brakes for such linear motor systems are typically based on the friction between the mover and a guide element therefor, for example a rail. The braking force is here at a right angle to the movement of the mover due to the normal force and is fixed by a coefficient of friction dependent on the material.

With such friction brakes, brake shoes are, for example, pressed against the guide element or the rail of the mover by means of one or more springs. The pressing force that is exerted by springs, for example, is typically compensated by means of a hydraulic system, a pneumatic system, or by electromagnetic means to open the brake.

The brakes can, on the one hand, exert a holding function when the mover is already at rest. If the mover is moving, the brake shoes can equally to pressed against the guide element or against the rail by hydraulic or pneumatic means to dissipate the kinetic energy of the mover.

Brakes based on friction have the general disadvantage that they are associated with wear at the mover and with a local wear at sections of the guide element or of the rail. A contamination of the guide element or of the rail can furthermore occur due to friction.

In linear motor systems that only have one single mover and in which the stator elements extend over a great length in comparison with the length of the mover, a brake is typically attached to the mover. In linear motor systems having a plurality of movers, in contrast, that have passive magnetic elements such as permanent magnets, the brakes are in contrast typically located in the region of the stator elements. On a power failure, there is a risk of collisions between a plurality of movers having different speeds. Bumpers are therefore frequently provided at the movers to weaken possible collisions.

It is an object of the invention to provide a linear motor system having an improved braking and/or holding function.

This object is satisfied by a linear motor system having the features of claim 1. The linear motor system comprises a plurality of stator elements that comprise magnetic coils, wherein one or more of the magnetic coils generate a magnetic flux in a respective stator element. The linear motor system comprises at least one mover that has at least one magnetic element that interacts with the magnetic coils of the stator elements. The mover is moved by means of activation of at least one stator element in a direction of movement relative to the stator elements.

At least one selected stator element is furthermore configured to change from a first state into a second state with respect to the magnetic flux and/or to have the second state permanently while at least some of the remaining stator elements remain in the first state. The selected stator element exerts a braking and/or holding force on the mover in the second state.

Since the braking and/or holding force on the mover/forcer is effected by the change of the magnetic flux of the at least one selected stator element with respect to the further stator elements, no mechanical friction is required between it and further elements of the linear motor system for the braking and/or holding of the mover. No wear between elements of the linear motor system therefore occurs on the braking and/or holding of the mover in the linear motor system in accordance with the invention. Furthermore, no contamination arises due to the friction between the mover and further elements.

The at least one selected stator element thus differs in the second state at least from some of the further stator elements of the linear motor system with respect to the magnetic flux. This difference can also remain in place when a current and voltage supply of the linear motor system is switched off or if a power failure occurs. The braking and/or holding function of the linear motor is thereby also maintained in such a case. If the linear motor system comprises a plurality of movers, they are consequently also braked or held on the switching off of the linear motor system or on a power failure. The risk of accidental collisions between a plurality of movers is thereby reduced in the linear motor system in accordance with the invention. The linear motor system can in other words have an implicit safety function with which one or more movers can also be braked or held in the switched-off state of the linear motor system.

In addition, the position of the at least one selected stator element can be suitably fixed along the linear motor system. It is thereby possible to brake and/or hold the mover at the predetermined position of the selected stator element and to thereby define a braking zone and/or a holding zone for the mover along its movement path. In other words, the selected stator element effects the braking of the mover and/or, as a holding catch, effects the latching at the predetermined position.

The other stator elements that remain in the first state can in particular be "normal" stator elements that are not provided for braking or holding the mover.

Advantageous embodiments of the invention are set forth in the dependent claims, in the description and in the drawings.

In accordance with an embodiment, the linear motor system comprises a plurality of stator elements that are configured to change between an active state and a passive state with respect to the magnetic flux such that the plurality of stator elements exert a braking force on the mover. The at least one selected stator element that exerts the braking and/or holding force on the mover and the plurality of stator elements that exert a braking force on the mover are here preferably arranged adjacent. The plurality of stator elements that change between the active state and the passive state can furthermore also comprise the at least one selected stator element that can then, on the one hand, change between the first state and the second state for holding/latching and, on the other hand, between the active state and the passive state for braking. The first state can in particular be formed by the active state, whereas the second state can be formed by the passive state.

The switchover or the change between the first and second states can generally take place mechanically and/or electrically as will be shown even more exactly below.

The mover can thus be braked along a predefined distance by the presence of the plurality of stator elements in addition to the at least one selected stator element and can, for example, stop at the position of the selected stator element. In other words, defined braking zones and holding zones can be established along the linear motor system by means of the plurality of stator elements and the at least one selected stator element. If the at least one selected stator element and the plurality of stator elements that exert the braking force on the mover are arranged adjacent, a braking zone is consequently arranged directly adjacent to a holding zone so that the mover can be braked in a predetermined manner and can e.g. be held in the holding zone by means of a latching force.

Two braking zones having a plurality of stator elements on both sides of a holding zone having at least one selected stator element can furthermore be arranged adjacent to one another. This makes possible a defined braking and holding function of the linear motor system in a predetermined region if a bidirectional movement of the mover is provided. With a unidirectional movement of the mover during which it, for example, moves on a closed path, an extended holding zone can furthermore be provided for safety that comprises a plurality of selected stator elements for exerting a holding force.

A similar securing function can also be established in that a braking zone having a plurality of starting elements and a subsequent holding zone having a selected stator element are followed by a further braking zone having a plurality of stator elements and by a further holding zone having a further selected stator element. With both a unidirectional and a bidirectional movement of the mover, three braking zones having a plurality of stator elements can furthermore be provided between which a respective holding zone having at least one selected stator element is arranged. This arrangement thus comprises two holding zones between which one or more movers of the linear motor system can be enclosed as required.

The linear motor system preferably has a control unit that controls the change of the at least one selected stator element between the first and second states and/or the change of the plurality of stator elements between the active and passive states. The function for changing between the respective states of the stator elements is thus relocated to the control unit in this embodiment. The stator elements can thus be designed simply and inexpensively since the function for changing between the states is not implemented therein per se.

In accordance with a further embodiment, the linear motor system comprises a device for short-circuiting the magnetic coils of the at least one selected stator element and/or of the plurality of stator elements. The magnetic coil of the at least one selected stator element is to be understood as a magnetic coil that generates a magnetic flux in the respective stator element. The magnetic coil here does not have to directly surround the respective stator element or be in direct mechanical contact with the stator element. The change of the plurality of stator elements and/or of the selected stator element from the active state to the passive state thus takes place in this embodiment by the short-circuiting of the respective magnetic coils. A short-circuit should here preferably generally comprise the generation of a braking effect in the mover by a conversion from magnetic energy or electrical energy into heat by means of the magnetic coil and/or an additional dissipation element (e.g. an ohmic resistor) electrically connected to the magnetic coil. The change into the passive state can generally also take place by a coupling of the magnetic coil to the dissipation element. The device for short-circuiting named in the following can accordingly also couple the dissipation element to the magnetic coil.

The second or passive state of the selected stator element or of the plurality of stator elements in this embodiment thus corresponds to a short-circuited state of the respective magnetic coils. The second state for exerting the braking and/or holding force by means of the selected stator element and the passive state for exerting the braking force on the mover by means of the plurality of stator elements can thus be set in a simple manner by short-circuiting magnetic coils in this embodiment. The short-circuit currents of the magnetic coils of the respective stator elements are used here to dissipate the energy of the mover or to convert it into thermal energy. The magnetic coils of the stator elements are preferably short-circuited by respective semiconductor switches. Due to the low impedance of such switches, a heat sink for leading off the dissipation heat is typically not necessary in this case. Among the usable semiconductor switches those are particularly preferred that have self-conductive semiconductors, for example those with a large band gap such as gallium nitride.

Alternatively, the magnetic coils of the stator elements can be short-circuited by means of electromechanical contacts. The device for short-circuiting the magnetic coils can thereby be implemented in an inexpensive manner.

The device for short-circuiting the magnetic coils is preferably integrated in the control unit. The stator elements per se can thereby in turn be configured in a simple and inexpensive manner. Alternatively, the device for short-circuiting the magnetic coils is preferably arranged in the region of the stator elements. This is in particular possible when switches composed of a semiconductor having a large band gap are used. In this case, a control unit only needs to control the device for short-circuiting the magnetic coils and the control unit can be configured correspondingly simpler since the short-circuiting of the magnetic coils per se is not carried out in it.

The device for short-circuiting the magnetic coils is preferably switched on ("normally on") in a passive state. In other words, the device is switched off (i.e. non-conductive) in the active state in which the magnetic coils are not short-circuited, i.e. during a normal operation of the linear motor system without a braking and/or holding function. A control signal can be applied to the device (e.g. a transistor) for this purpose in the active state. The magnetic coils of the stator elements are conversely short-circuited when the device is in the passive state, i.e. when no control signal is applied to the device. The short-circuiting of the magnetic coils thus also takes place on a switching off of the linear motor system and on a power failure. If the linear motor system comprises a plurality of movers, the risk of collisions of the plurality of movers can thereby be reduced.

In accordance with a further embodiment, at least one selected stator element that permanently has the second state is formed in that the stator element is configured as reduced in size and/or has a different spacing from other stator elements and/or in that the stator element is at least substantially missing. For example, the stator elements can each comprise a "tooth" of a magnetically conductive material, with the tooth preferably extending toward the mover or toward the track and simultaneously being able to extend perpendicular to the direction of movement of the mover. A stator element reduced in size can now be formed by a shortened tooth. Alternatively or additionally, the "normal" spacing between the stator elements can e.g. be increased to form the different spacing. It is finally also still possible to also at least substantially omit a stator element (decrease to zero).

The different spacing with the selected stator element can in particular be different from adjacent stator elements and/or different from the normal spacing, i.e. the typically used spacing.

A region can thus be implemented along the track by the selected stator element in which the energy of the magnetic (mover) field is different from the "non-selected" stator element or from the normal stator elements. A latching or holding force can be generated by the energy difference, with this force behaving proportionally to the energy difference.

It is understood that it is also additionally always still possible for a stator element that is permanently in the second state to selectively short-circuit the magnetic coil of this selected stator element. This in particular applies in the case of selected stator elements reduced in size or of selected stator elements having a different spacing. The holding or braking force can hereby be further amplified. It must additionally be noted that selected stator elements can also simultaneously form some of the plurality of stator elements. A magnetic coil can generally be arranged around a respective tooth of the stator element.

In accordance with a further embodiment, the spacing between two stator elements that are each arranged next to the at least one stator element, is approximately equal to the spacing of two magnetic poles in the magnetic element of the mover in the direction of movement of the mover. The two stator elements on both sides of the selected stator element are thus respectively disposed opposite the two magnetic poles at the mover. Since the spacing between the respective magnetic poles of the two stator elements and those of the mover is minimized, a particularly large holding force that is exerted on the mover can be implemented in this manner.

The control device is furthermore advantageously configured to compensate by means of e.g. a forward control the braking and/or holding force that the at least one selected stator element exerts on the mover. If a braking and/or holding force is exerted on the mover during a normal operation of the linear motor system, the control device controls magnetic coils of adjacent elements of the selected stator element, for example, such that their magnetic flux compensates the missing magnetic flux of the selected stator element. Fluctuations in a driving force that is exerted on the mover by the stator elements can thereby to compensated to move it evenly.

In accordance with a further embodiment, the linear motor system is a linear motor system having a longitudinal magnetic flux in which the magnetic flux of the stator elements substantially extends in the direction of movement of the mover. In this embodiment, the at least one selected stator element can, as already stated above, be formed in that one of the stator elements is at least partly removed. The position of the selected stator element or of a holding zone for the mover is thereby statically fixedly predefined. In the case of a removed stator element, the possibly remaining region of the stator is called a selected stator element. An at least part removal of a stator element can also take place by displacing a stator element along the direction of movement.

Alternatively, the at least one selected stator element can be configured in an embodiment of the linear motor system with a longitudinal magnetic flux to change between the first and second states in that the selected stator element can be at least partly removed and/or deactivated. In such an embodiment, the position of the selected stator element or of the holding zone for the mover connected to the stator element is admittedly predetermined. The holding zone can, however, be dynamically switched off by a repeat addition or activation of the selected stator element after said holding zone had been previously switched on by means of a removal and/or deactivation of the selected stator element.

In accordance with a further embodiment, the linear motor system is a linear motor system having a transverse magnetic flux in which the magnetic flux of the stator elements substantially extends at a right angle to the direction of movement of the mover. In such an embodiment, the at least one selected stator element can change between the first and second states in that magnetic connections between the selected stator element and stator elements adjacent at both sides are interrupted. The selected stator element is here, for example, magnetically insulated with respect to adjacent stator elements. This magnetic insulation can, however, be selectively bridged again to deactivate a holding zone that is formed by the selected stator element.

Alternatively in such an embodiment of a linear motor system having a transverse magnetic flux, the at least one selected stator element can be configured to change between the first and second states in that permanent magnets are arranged and/or electromagnets can be activated between the selected stator element and stator elements adjacent at both sides. The magnetic flux can thus be changed by the permanent magnets and/or by the electromagnets in the region of the selected stator element in comparison with the further stator elements. In the case of the permanent magnets, this change can be canceled by a bridging of the permanent magnets. In contrast to this, the electromagnets configure activation and deactivation of a holding zone for the mover without mechanical elements being required for the bridging.

In accordance with a further embodiment, an air gap is present between the stator elements and the magnetic element of the mover. A smaller spacing between the magnet and the stator elements (i.e. the linear motor formed in this manner) is created by the air gap so that the magnet does not rub against the linear motor. The mover can accordingly only have mechanical contact with the linear motor in the region of a rail or of a track. The track can, for example, be formed by two rails spaced apart from one another, with the mover being able to run on the rails by means of rollers. A large number of stator elements arranged behind one another can be provided below and/or within the track.

The invention also relates to a method of operating a linear motor system that has a plurality of stator elements that comprise magnetic coils, with one or more of the magnetic coils producing a magnetic flux in a respective stator element. A mover having a magnetic element is moved by means of activation of at least one stator element in a direction of movement relative to the stator elements. Furthermore, a selected stator element changes from a first state into a second state with respect to the magnetic flux and/or remains permanently in the second state while at least some of the remaining stator elements remain in the first state. The selected stator element exerts a braking and/or holding force on the mover in the second state.

The invention will be explained in the following purely by way of example with reference to possible embodiments of the invention and to the enclosed drawing. There are shown.

Figure 1:
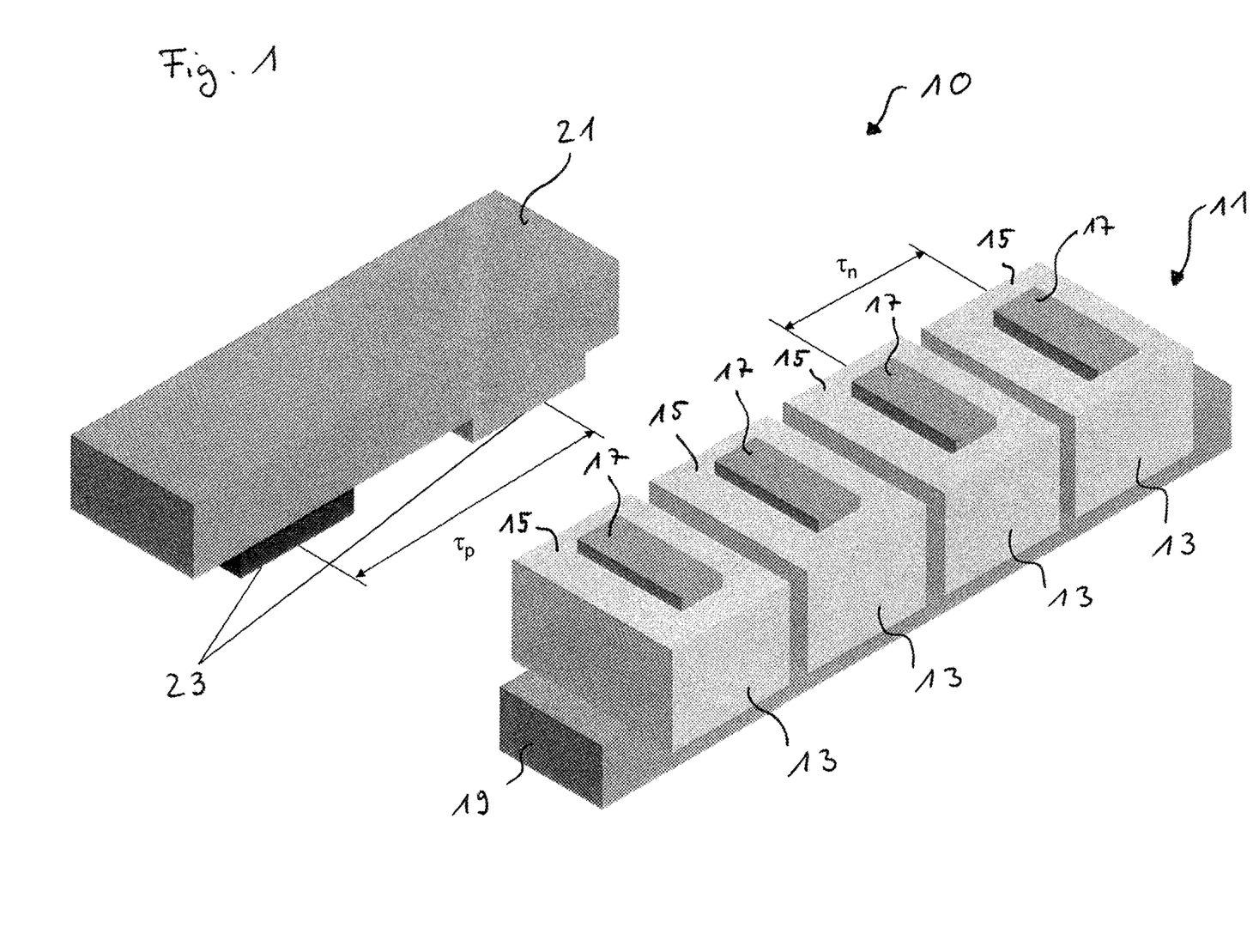
FIG. 1 a schematic representation of a linear motor system having a longitudinal magnetic flux.

FIG. 1 shows an exemplary linear motor system 10 that comprises a stator 11 having stator elements 14. The stator elements 13 each have a magnetic coil 15 and a core 17. The stator elements 13 are furthermore connected to one another by means of a lamination 19. The stator elements 13 are also called spaced teeth of the linear motor system 10 (cf. the representations in FIGS. 3A to 4C).

In addition, the linear motor system 10 comprises a mover 21 that has permanent magnets 23 that each form a magnetic pole of the mover as the magnetic element. It is understood that the double-pole mover 21 shown in the Figures only serves for a simplified representation. Movers 21 with a larger number of poles are also possible. The mover 21 is moved along the stator 11 or the stator elements 13 by the activation of the magnetic coils 15 in one or more stator elements 13. To drive the mover 21, a spacing $\tau_p$ between center axes of the permanent magnets 23 of the mover 21 aligned perpendicular to the direction of movement of the mover 21 differs from a spacing $\tau_n$ between center axes of the stator elements aligned perpendicular to the direction of movement of the mover 21. With a double-pole mover 21, $\tau_p$ is typically 1.5 times the amount of $\tau_n$, i.e. $2\tau_p \approx 3\tau_n$.

The linear motor system 10 shown in FIG. 1 is furthermore a linear motor system having a longitudinal magnetic flux. This means that the magnetic flux of the stator elements 13 substantially extends in the direction of movement of the mover 21. The linear motor system 10 furthermore comprises guide elements, not shown, for the mover 21 (such as rails) to fix a movement path for the mover 21. The stator elements 13 are arranged beneath the guide elements.

Figure 2:
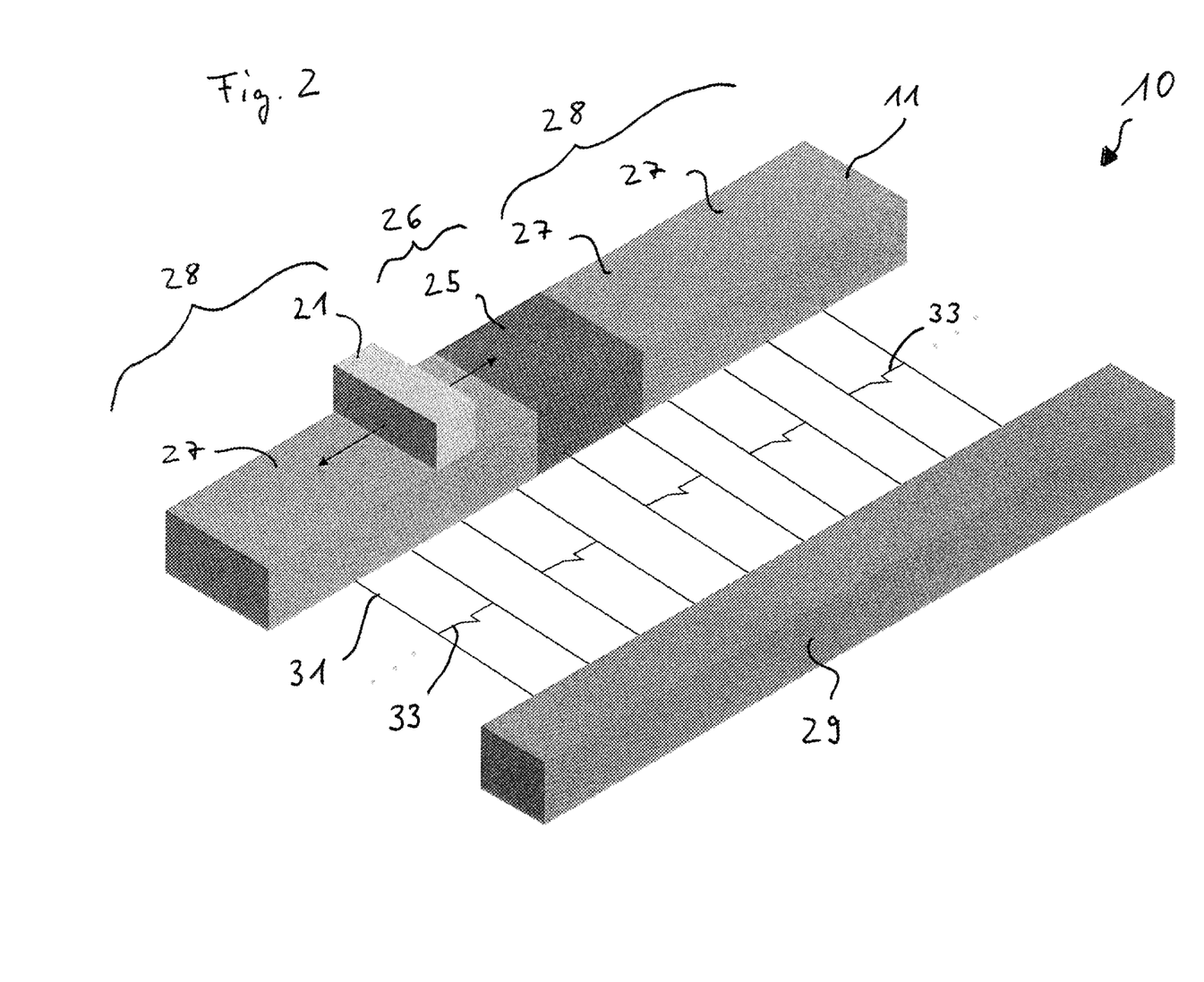
FIG. 2 a schematic representation of a section of a linear motor system in accordance with the invention.

A section of a linear motor system 10 in accordance with the invention is shown in FIG. 2. The stator 11 of the linear motor system 10 in this section comprises stator elements 13 that differ from the other stator elements 13 outside the section shown. The stator elements 13 in the section shown, on the one hand, comprise a selected stator element 25 that defines a holding zone 26 for the mover 21 as well as a plurality of stator elements 27 that each define a braking zone 28 at both sides of the holding zone 26. The plurality of stator elements 27 thus serve for the braking of the mover 21 while the selected stator element 25 acts as a holding latch and is provided for latching the mover 21.

To control the selected stator element 25 and the plurality of stator elements 27, the linear motor system 10 comprises a control unit 29 that is coupled to the stator elements 25, 27 by means of electrical connections. Devices 33 for short-circuiting the magnetic coils of the respective stator elements 25, 27 are furthermore shown in the region of the electrical connections 31.

The stator elements 25, 27 are switched by means of the devices 33 for short-circuiting the magnetic coils from an active state in which they are provided to drive the mover 21 into a passive state in which their magnetic coils are short-circuited and in which the stator elements 25, 27 therefore exert a braking force on the mover 21. The short-circuit currents of the stator coils are used here to dissipate the kinetic energy of the mover 31 or to convert the kinetic energy into heat.

The devices 33 for short-circuiting the magnetic coils are semiconductor switches that comprise a self-conductive semiconductor having a large band gap such as gallium nitride. Due to the use of such semiconductor switches that have a short conductance time and a low impedance, the linear motor system 10 in accordance with the invention does not require any heat sink to lead off the heat that arises due to the dissipation of the kinetic energy of the mover 21.

The devices 33 for short-circuiting the magnetic coils are furthermore shown between the control unit 29 and the stator 11 of the linear motor system 10 since the devices 33 can be integrated into the linear motor system 10 in two different manners. On the one hand, the devices 33 for short-circuiting the magnetic coils can be integrated in the control device 29. In this case, the stator elements 27 in the braking zones 28 do not differ from the other stator elements 13 of the stator 11. Since the devices 33 are configured as semiconductor switches in the present embodiment, the devices 33 can also alternatively be integrated in the stator elements 25, 27. The control unit 29 is thereby simplified since the function for short-circuiting the magnetic coils is so-to-say relocated in the stator 11.

The devices 33 for short-circuiting the magnetic coils are furthermore integrated in the control of the stator elements 25, 27 such that the semiconductor switches are closed on a switching off of the control unit 29, i.e. also in the event of a power failure, so that the magnetic coils of the stator elements 25, 27 are also short-circuited on the switching off or on a failure of the control unit 29. The linear motor system 10 thereby has an automatic safety function since the mover 21 is, for example, automatically braked on a power failure due to the short-circuited magnetic coils of the stator elements 25, 27. If the linear motor system 10 has a plurality of movers 21, unwanted collisions of a plurality of movers 21 can be avoided, for example, by this security function.

The selected stator element 25 in the holding zone 26 furthermore differs with respect to the magnetic flux that is generated by it from the plurality of stator elements 27 in the braking zone 28. Due to the changed magnetic flux in the holding zone 26, the selected stator element 25 exerts a holding force on the mover 21 if the mover 21 is in the region of the selected stator element 25 or in the holding zone 26 and if it has previously been sufficiently braked by means of the plurality of stator elements 27 in the braking zone 28. The difference between the selected stator element 25 in the holding zone 26 and the plurality of stator elements 27 in the braking zone 28 will be explained in the following with reference to the embodiments shown in FIGS. 3A to 3C and 4A to 4C.

Figure 3A:
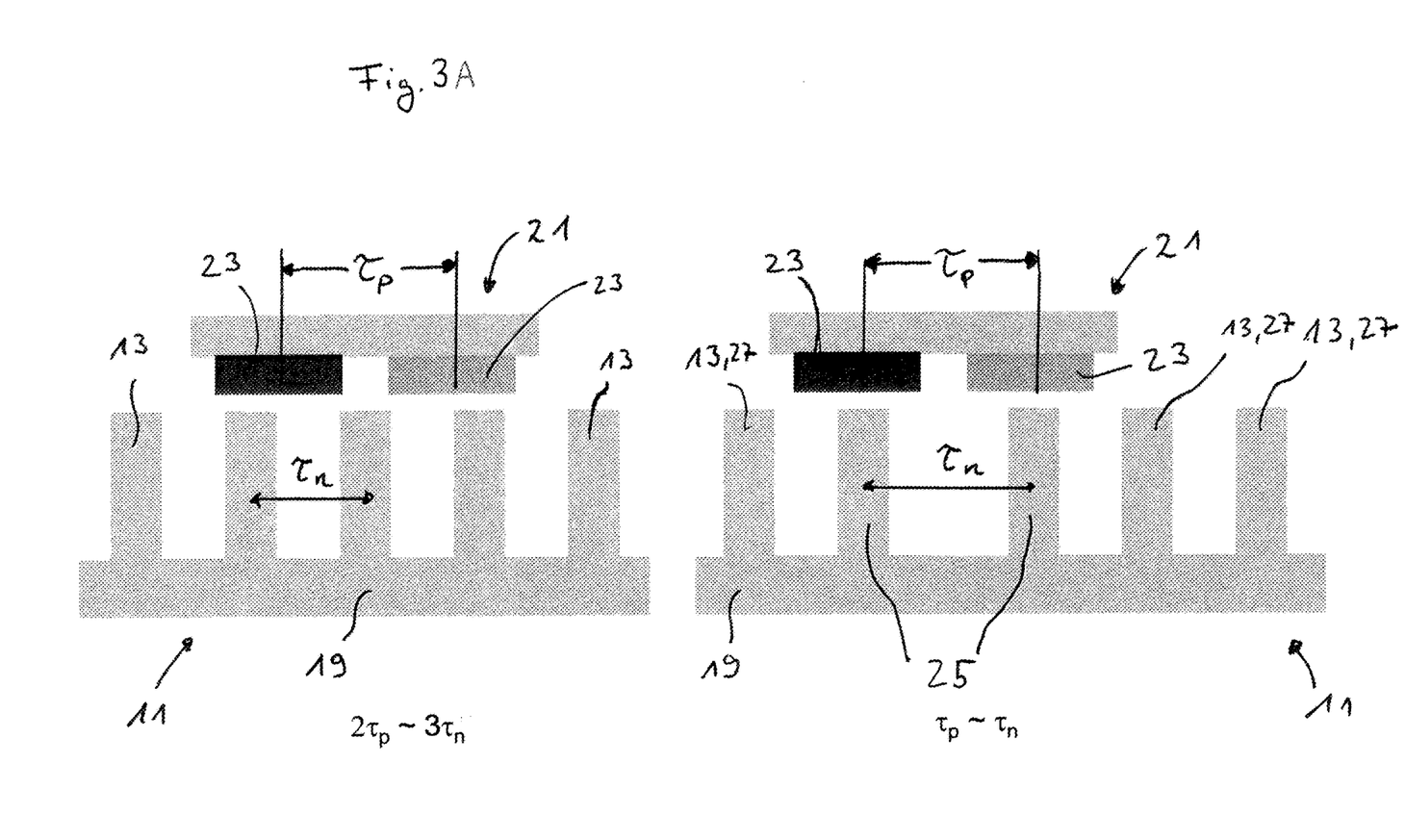
FIGS. 3A to 3C schematic representations of different embodiments of a linear motor system in accordance with the invention having a longitudinal magnetic flux.

FIG. 3A shows a schematic side view of sections of the linear motor system 10 having the stator 11 and the mover 21. The arrangement of the stator elements 13 is shown on the left side in normal operation or outside the braking zone 28 and the holding zone 26.

In normal operation, the spacing $\tau_n$ between the stator elements 13 or the teeth of the linear motor system 10, i.e. the spacing between their center axes perpendicular to the direction of movement of the mover 21, differs from the spacing $\tau_p$ between the corresponding center axes of the permanent magnets 23 of the mover 21. $2\tau_p \approx 3\tau_n$ applies in the present case, as was already explained above in connection with FIG. 1. The mover 21 is moved relative to the stator elements 13 when the stator elements 13 are activated. The movement or the drive of the mover 21 results from an interaction of the magnetic flux generated by the magnetic coils of the stator elements 13 with the magnetic elements or with the permanent magnets 23 of the mover 21.

Figure 3B:
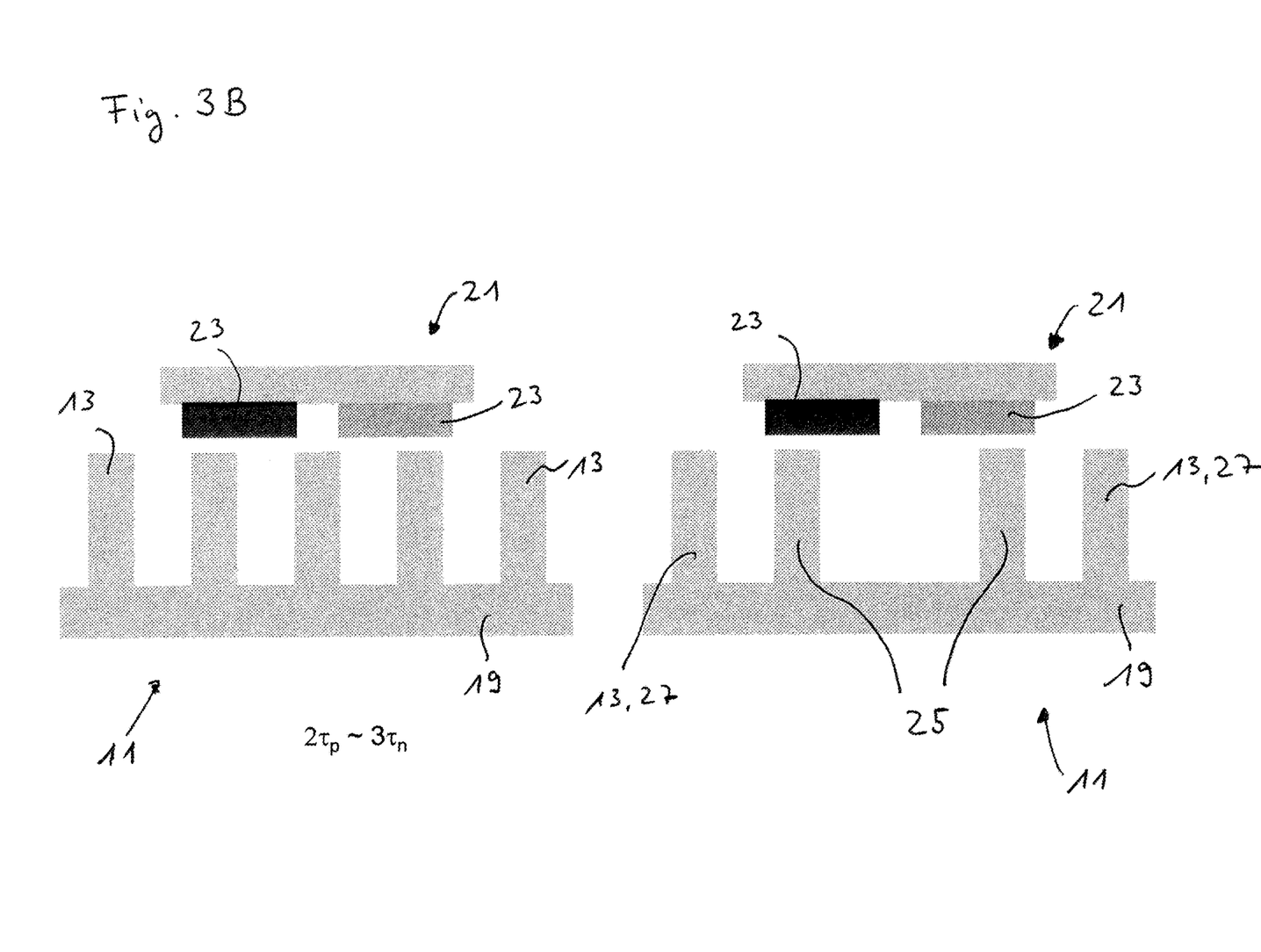
Figure 3C:
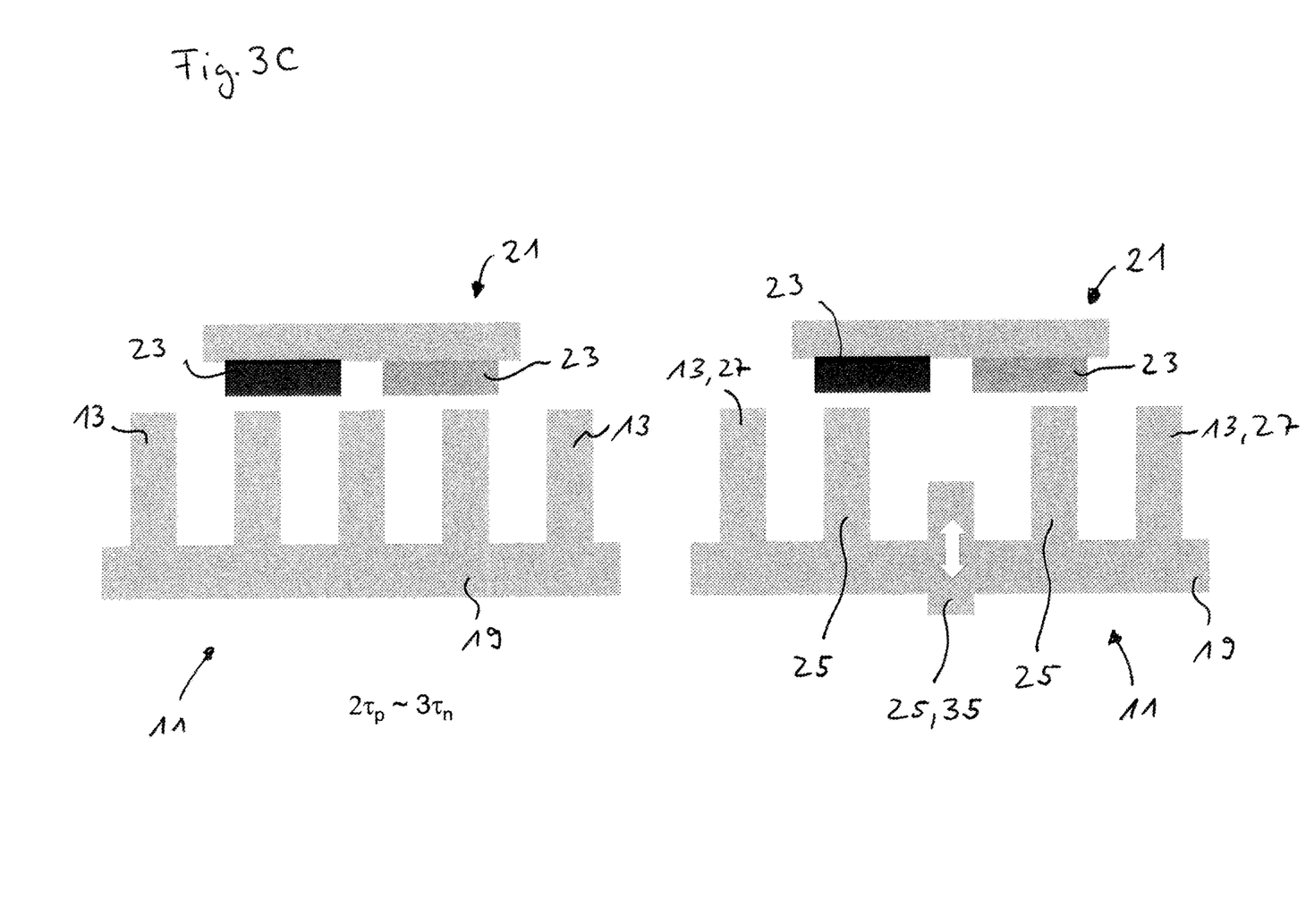

The linear motor system 10 shown in FIGS. 3A to 3C is a linear motor system having a longitudinal magnetic flux of the stator elements 13 that substantially extends in the direction of movement of the mover 21. A holding zone can be implemented with such a linear motor system 10 such as is shown in the embodiment at the right side of FIG. 3A.

In this embodiment, two selected stator elements 25 or teeth are displaced in comparison with the other stator elements 13 and 27 such that the spacing between the selected stator elements 25 corresponds to the spacing between the center axes of the permanent magnets 23 of the mover 21. $\tau_p \approx \tau_n$ thus applies to the selected stator elements 25 in this case. If the mover 21 has previously been sufficiently braked by means of the stator elements 27 in the braking zone 28 or is at a standstill, the selected stator elements 25 exert a magnetic attractive force or holding force on the mover 21 due to their increased spacing that corresponds to the spacing of the permanent magnets 23 of the mover 21.

In the further embodiment shown in FIG. 3B, the spacing between the two selected stator elements 25 is further increased in comparison with the spacing of the selected stator elements 25 of FIG. 3A so that the spacing between the selected stator elements 25 is now twice as much as the spacing $\tau_n$ between the further stator elements 13, 27. In other words, one of the stator elements 13 or one of the teeth is missing in the embodiment shown in FIG. 3B. Although the spacing between the selected stator elements 25 no longer corresponds to the spacing of the permanent magnets 23 of the mover 31 in comparison with FIG. 3A, a sufficient holding force is nevertheless exerted on the mover 21 due to the lack of a stator element 13. FIGS. 3A and 3B thus show selected stator elements 25 that are permanently in the second state.

The further embodiment of the linear motor system 10 of FIG. 3C in contrast shows selected stator elements 25 of which a stator element 35 or a tooth is movable such that it can be at least partly removed from the row of further stator elements 13, 25, 27. The removable stator element 35 is thus switchable between two states, with it being arranged between the further stator elements 13, 25, 27 in the first state and thus being operated in an identical manner to them. The first state thus corresponds to a normal operation of the linear motor system 10 in which the holding zone 26 is deactivated. In the second state, in contrast, the removable stator element 35 is no longer between the further stator elements 13, 25, 27 so that the second state corresponds to the embodiment shown in FIG. 3B with a missing tooth. In the second state, the further selected stator elements 25 that are arranged at both sides of the removable stator element 35 exert a holding force on the mover 21 in the same way as has been described above for the embodiment of FIG. 3B.

The arrangement of the left side of FIG. 3A is respectively shown again on the left side of FIGS. 3B and 3C, i.e. a section of the linear motor 10 without a displaced, removed, or removable stator element 13, 25, or 35 and thus without a holding zone 26, to simplify the comparison of the respective embodiment with this arrangement for the normal operation of the linear motor 10.

Figure 4A:
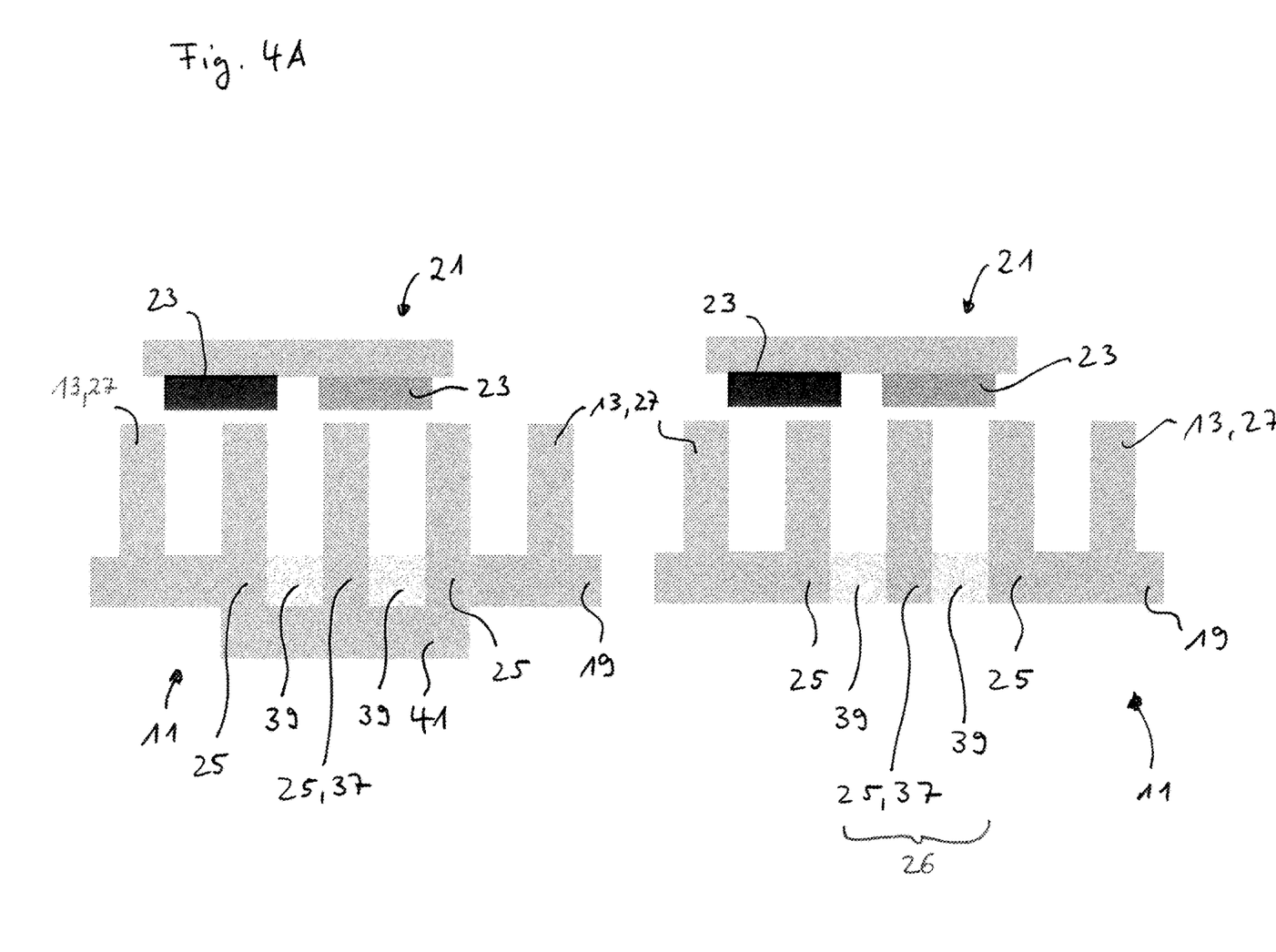
FIGS. 4A to 4C schematic representations of different embodiments of a linear motor system in accordance with the invention having a transverse magnetic flux.
Figure 4B:
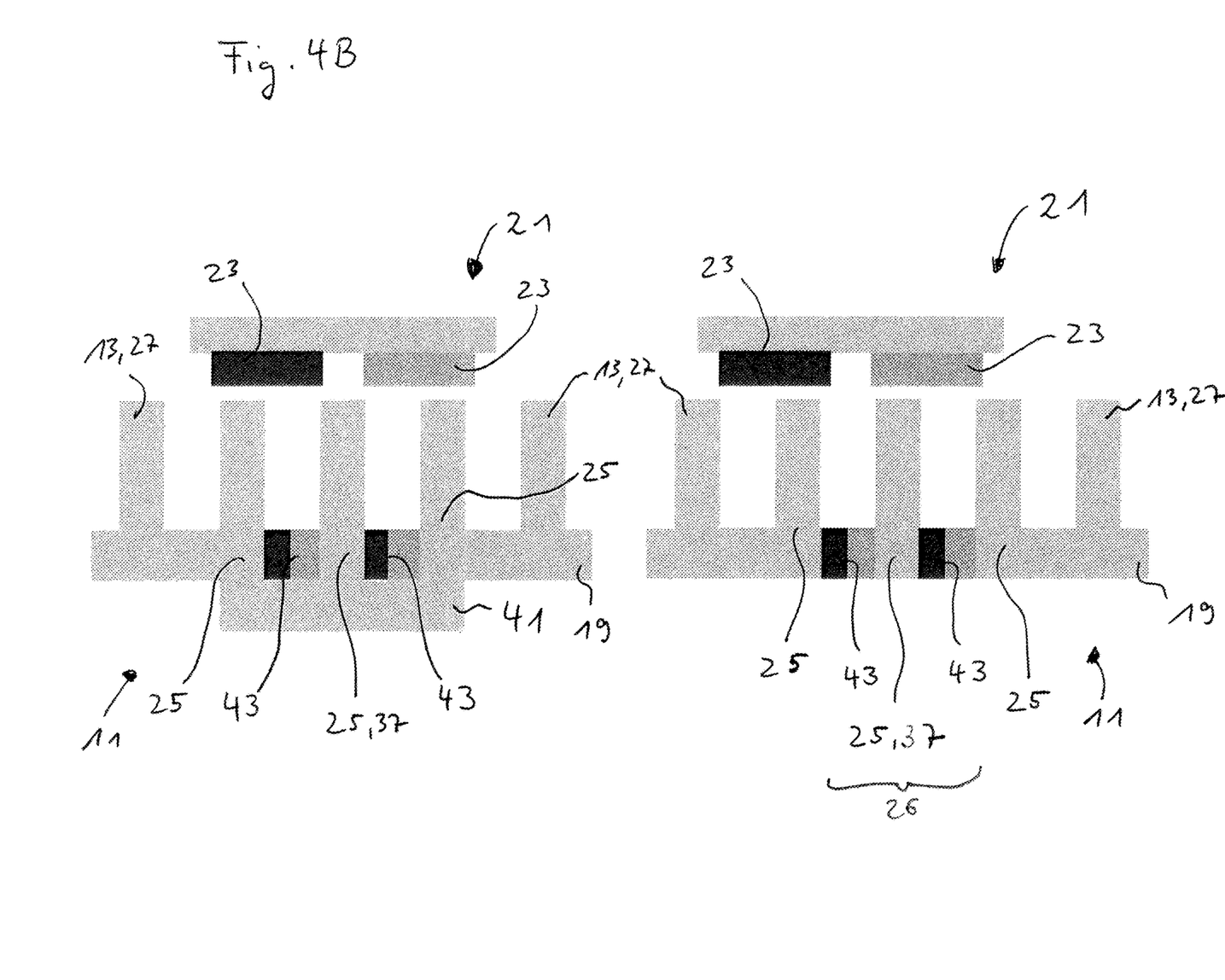
Figure 4C:
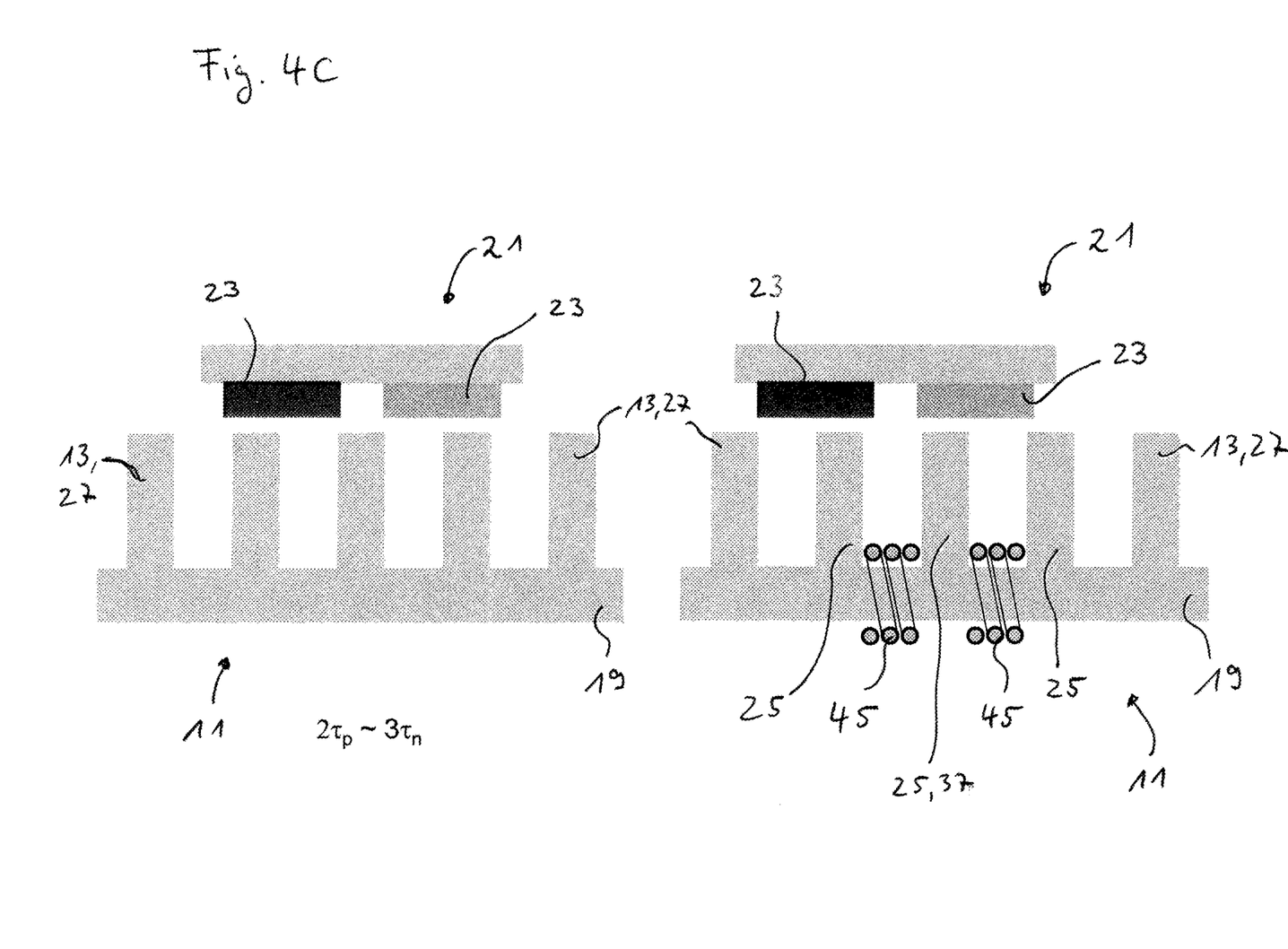

FIGS. 4A, 4B, and 4C show embodiments of the linear motor system 10 in accordance with the invention in which it is a linear motor system having a transverse magnetic flux of the stator elements 13 that extends substantially at a right angle to the direction of movement of the mover 21. In these embodiments, one of the selected stator elements 25 is magnetically insulated with respect to the adjacent stator elements and is therefore called a magnetically insulatable stator element 37. The magnetic insulation of the element 37 has the effect in the linear motor system 10 having a transverse magnetic flux that a gap is created between the stator elements 13, 25, 27 that interact with the magnetic element or with the permanent magnet 23 of the mover 21. The adjacent stator elements 25 of the insulated stator element exert a holding force on the mover 21 through this gap in a similar manner as with the embodiment of FIG. 3B for a linear motor system 10 having a longitudinal magnetic flux in which a stator element has been removed.

In the embodiment shown in FIG. 4A, the lamination 19 of the stator 11 is interrupted by two non-magnetic connections 39 to magnetically insulate the stator element 37 with respect to the adjacent stator elements 25. The stator elements 25, 37 form a holding zone 26 along the stator 11 due to the holding force on the mover 21 exerted by the adjacent stator elements 25. This holding zone 26 can, however, be deactivated by means of a bridging device 41 that is shown in the representation on the left side of FIG. 4A. The non-magnetic connections 39 can be bridged by means of the bridging device 41 so that the stator element 37 no longer differs from the adjacent stator elements 13, 25. In other words, the selected stator element 25, 37 is switched over by means of the bridging device 41 between a first state in which the magnetic insulation is canceled with respect to the adjacent stator elements 25 and which is shown on the left side in FIG. 4A and a second state in which the stator element 37 is magnetically insulated with respect to the adjacent stator elements 25 so that they exert a holding force on the mover 21.

In the further embodiment shown in FIG. 4B, the non-magnetic connections 39 of FIG. 4A have been replaced with permanent magnets 43. The permanent magnets 43 thus like the non-magnetic connections 39 provide a magnetic insulation of the stator element 37 with respect to the adjacent stator elements 25. The adjacent selected stator elements 25 thus in turn exert a holding force on the mover 21 and thus define a holding zone 26 along the stator 11. This holding zone can as in the embodiment shown in FIG. 4A be canceled by means of a bridging device 41 such as is shown on the left side of FIG. 4B.

Furthermore, in the embodiment shown in FIG. 4C, the non-magnetic connections 39 of FIG. 4A and the permanent magnets 43 of FIG. 4B have been replaced with electromagnets 45 that are each arranged at both sides of the stator element 37. The stator element 37 is in turn magnetically insulated with respect to the adjacent selected stator elements 35 by activation of the electromagnets 45 so that said selected stator elements 35 exert a holding force on the mover 21. If the electromagnets 45 are in contrast deactivated, the stator element 37 does not differ from the further stator elements 13, 25, 27, as is shown on the left side of FIG. 4C. In the embodiment shown in FIG. 4C, no bridging device 41 is thus required between the stator elements 25. Instead, the selected stator elements 25, 37 are switched over between the first state without a holding force and the second state with a holding force for mover 21 by activating and deactivating the electromagnets 45.

Figure 5A:
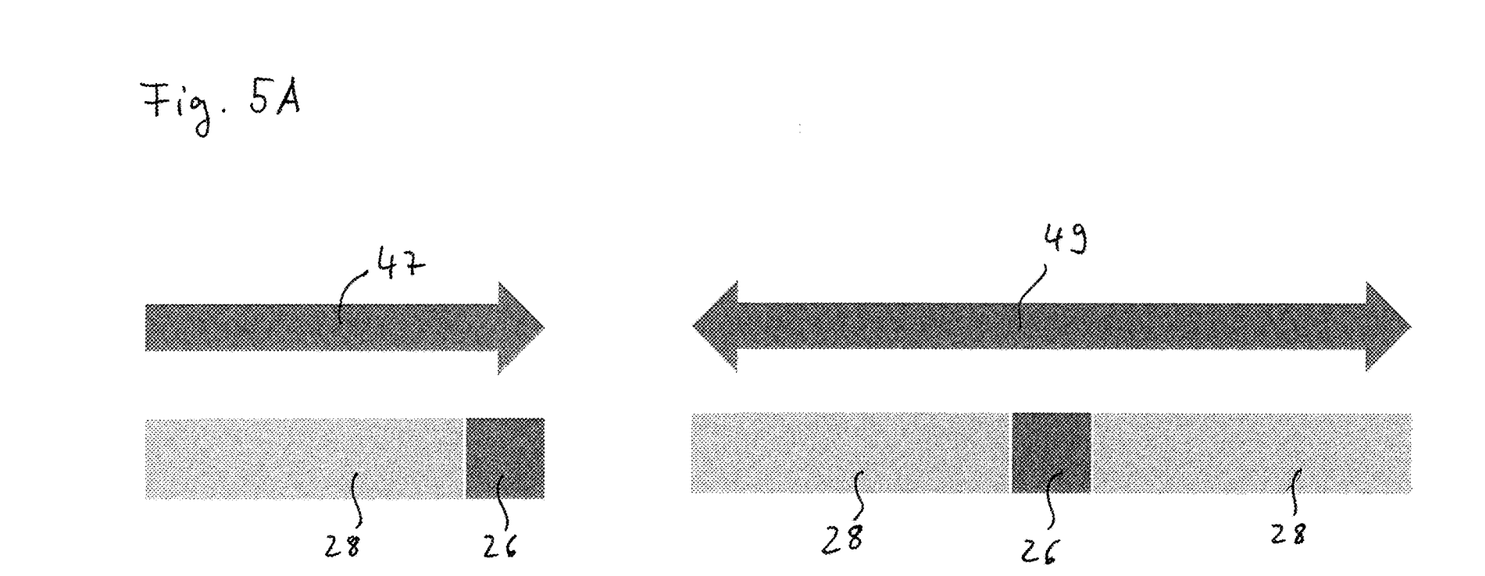
FIGS. 5A to 5C different arrangements of braking zones and holding zones of linear motor systems in accordance with the invention.
Figure 5B:
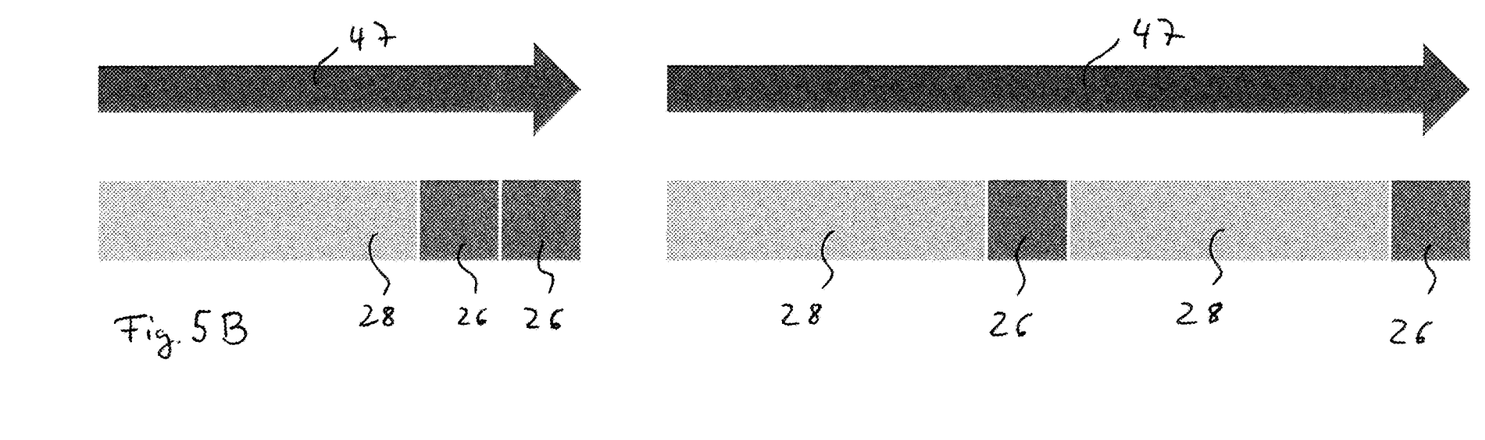
Figure 5C:
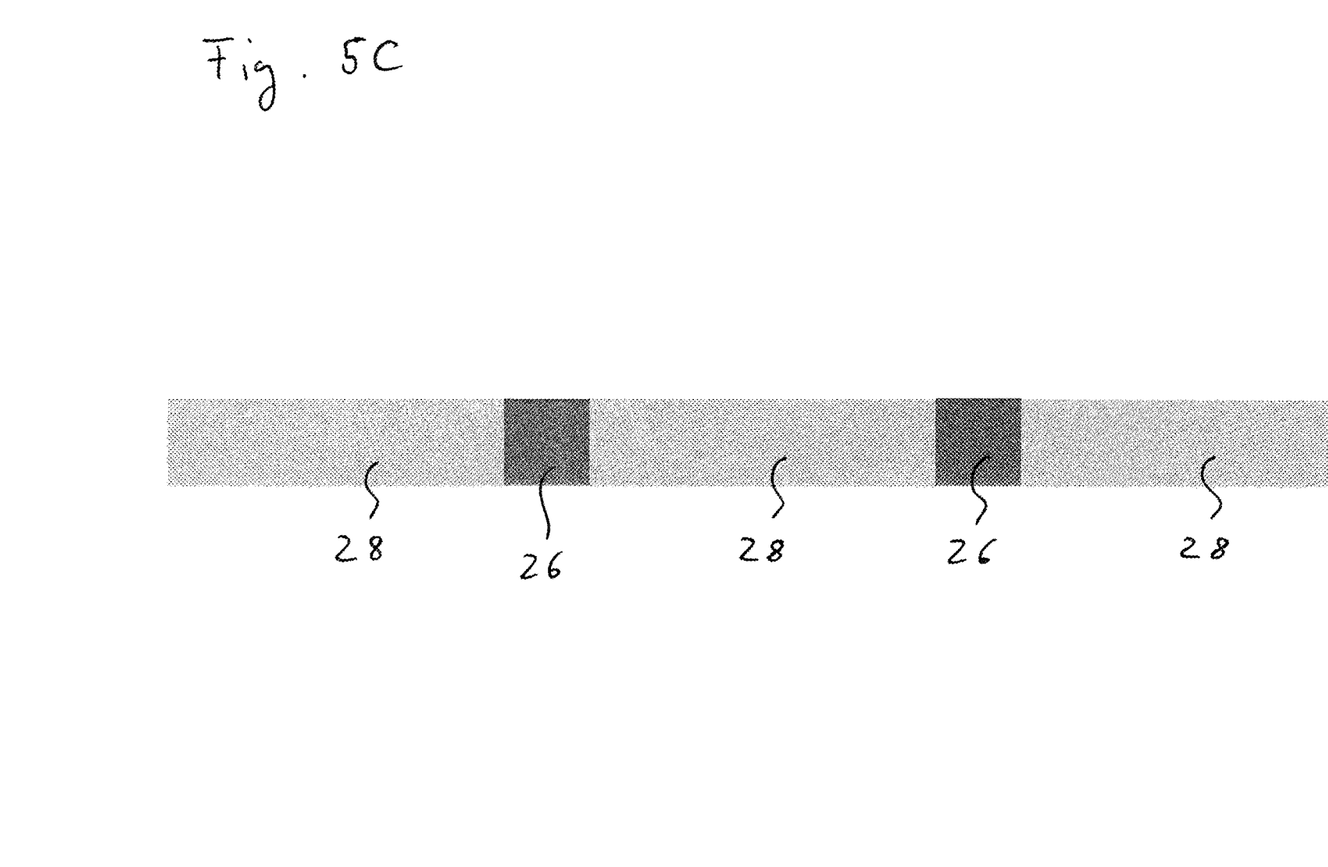

Different arrangements of braking zones 28 and holding zones 26 along the linear motor system 10 are shown in FIGS. 5A, 5B, and 5C. If only a unidirectional movement of the mover 21 is provided that is indicated by the arrow 47 in FIGS. 5A to C and on which the mover 21, for example, moves along a closed path, a sequence of a single sufficiently long braking zone 28 and of a holding zone 26 is sufficient to implement the desired braking and holding functions. If, however, a bidirectional movement of the mover 21 takes place as is indicated by the double arrow 49 on the right side of FIG. 5A, a respective braking zone 28 is located at both sides of the holding zone 26.

In the embodiments shown in FIG. 5B, additional security functions are implemented in that an additional, redundant holding zone 26 is established (cf. the left side of FIG. 5B) or in that a double sequence of the braking zone 28 and of the holding zone 26 is provided, i.e. a further braking zone 28 that follows a holding zone 26 and a further holding zone 26 that adjoins the further braking zone 28 (cf. the right side of FIG. 5B).

In the arrangement of FIG. 5C, a braking zone 28 is provided between two holding zones 26 and a respective further braking zone 28 is located outside these holding zones 26. The mover 21 can be enclosed between the two holding zones 26 in such an arrangement.

A further security function, for example in addition to the redundant holding and braking zones 26, 28 shown in FIG. 5B, can be achieved in that the elements for controlling the stator elements 13 such as the devices 33 (cf. FIG. 2 for short-circuiting the magnetic coils are such devices that are switched on, i.e. conductive, in a passive state. This means that these devices are not conductive on activation and are thereby also activated when currents and/or voltages are switched off, for example on a power failure.

Figure 6A:
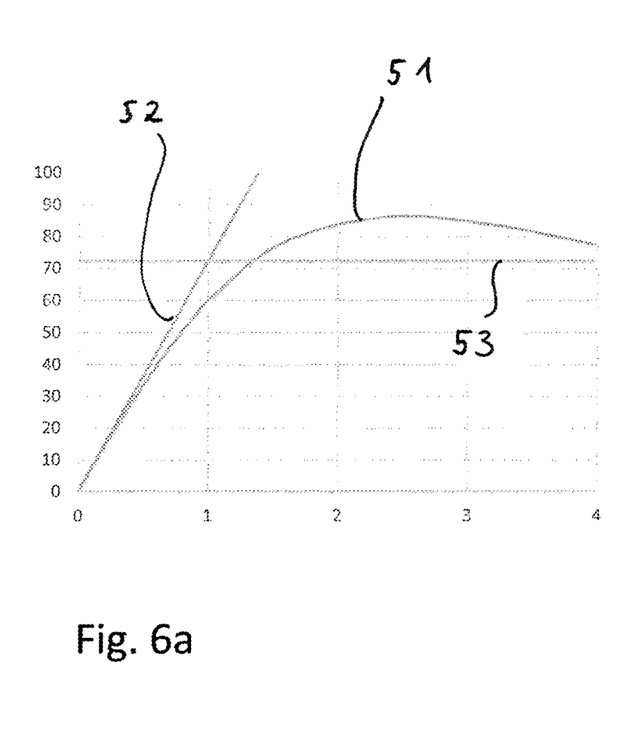
FIGS. 6A and 6B results of simulation calculations for a braking force and a required length of a braking zone for an embodiment of the linear motor system in accordance with the invention.
Figure 6B:
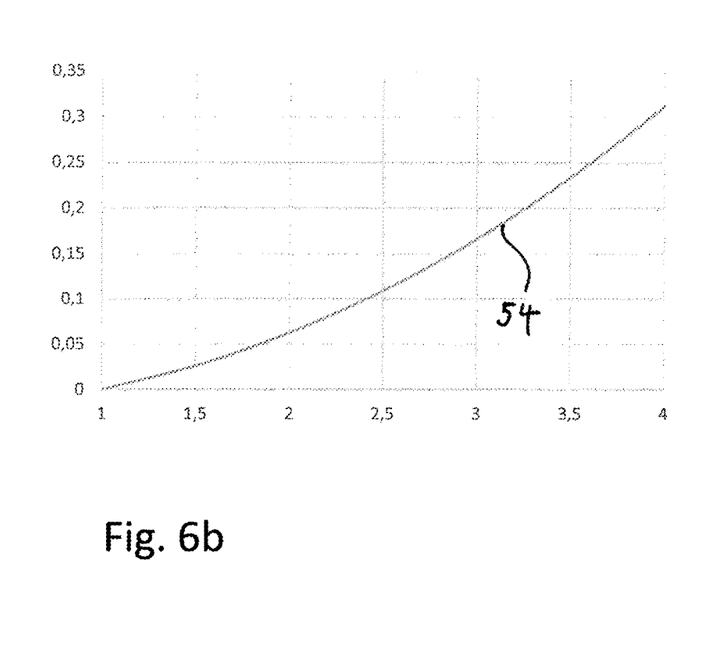

Results of simulation calculations for the braking force that the selected stator elements 25 exert on the mover 21 are shown in FIGS. 6A and 6B. An arrangement such as is shown on the right side in FIG. 3A is the starting point here. The spacing Tip between the center axes of the permanent magnets 23 of the mover 21 thus corresponds to the spacing of two stator elements 25 in the direction of movement of the mover. In addition, it is assumed in the simulation calculations that the speed of the mover 21, the magnetic field of the permanent magnets 23 in the air gap, and the currents through the magnetic coils of the stator elements 25 in the grooves are perpendicular to one another. It is furthermore assumed that the amount of the magnetic field at the surface of the permanent magnets 23 is constant.

The force in N exerted on the mover is entered on the y axis over the speed of the mover 21 in m/s at the x axis in FIG. 6A. The curve 51 shows the result of a complex vector model while the curve 52 represents the result of a quasi-stationary model and the curve 53 represents a constant force. The curve 51 can thus be approximated in a good approximation at speeds up to 1 m/s by the curve 52 of the quasi-stationary model and at greater speeds than 1 m/s by the constant force 53.

The required length of a braking zone for braking a mover having a mass of 3 kg for speeds of more than 1 m/s that are entered on the x axis are shown by the curve 54 in FIG. 6B. The required length in meters is entered on the y axis here. The simulation calculations show that a relatively short braking zone having a length of less than 0.35 m is required for the speeds indicated and that the braking force at a selected stator element 25 is sufficient for braking and holding the exemplary mover 21 having a mass of 3 kg.

REFERENCE NUMERAL LIST 10 linear motor system
11 stator
13 stator element
15 magnetic coil
17 magnetic core
19 lamination
21 mover
23 permanent magnet
$\tau_P$ spacing of two magnetic poles in the mover
$\tau_n$ spacing of two magnetic poles in the stator
25 selected stator element
26 holding zone
27 stator elements of the braking zone
28 braking zone
29 control unit
31 electrical connections
33 device for short-circuiting
35 removable stator element
37 magnetically insulatable stator element
39 non-magnetic connection
41 bridging device
43 permanent magnet
45 electromagnet
47 arrow
49 double arrow
51 curve of the braking force for complex vector model
52 curve of the braking force for quasi-stationary model
53 constant force
54 curve for the length of the braking zone

The invention claimed is:

1. A linear motor system comprising
a plurality of stator elements that comprise magnetic coils, wherein one or more magnetic coils generate a magnetic flux in the respective stator element; and
at least one mover that has at least one magnetic element that interacts with the magnetic coils of the stator elements, wherein the mover is moved by way of activation of at least one stator element in a direction of movement relative to the stator elements,
wherein at least one selected stator element is configured to change with respect to the magnetic flux from a first state into a second state or to have the second state permanently, while at least some of the other stator elements remain in the first state so that the selected stator element exerts a holding force on the mover in the second state, and
wherein the at least one selected stator element is configured to change between the first and second states in that a stator element can be at least partly removed.

2. The linear motor system in accordance with claim 1, wherein
a plurality of stator elements that are configured to change with respect to the magnetic flux between an active state and a passive state such that the plurality of stator elements exert a braking force on the mover.

3. The linear motor system in accordance with claim 1, wherein
the at least one selected stator element that exerts the holding force on the mover and the plurality of stator elements that exert a braking force on the mover are arranged adjacent.

4. The linear motor system in accordance with claim 1, wherein
the linear motor system comprises a control device that controls the change of the at least one selected stator element between the first and second states and/or the change of the plurality of stator elements between the active and passive states.

5. The linear motor system in accordance with claim 2, wherein
the linear motor system comprises a device for short-circuiting the magnetic coils of the at least one selected stator element and/or of the plurality of stator elements, with the change of the plurality of stator elements and/or of the selected stator element from the active state into the passive state taking place by the short-circuiting of the respective magnetic coils.

6. The linear motor system in accordance with claim 4, wherein
a device for short-circuiting the magnetic coils is integrated in the control device.

7. The linear motor system in accordance with claim 5, wherein
the device for short-circuiting the magnetic coils is arranged in the region of the stator elements.

8. The linear motor system in accordance with claim 1, wherein
a device for short-circuiting the magnetic coils is switched on in a passive state.

9. The linear motor system in accordance with claim 1, wherein
at least one selected stator element that permanently has the second state is formed in that the stator element is reduced in size or has a different spacing from other stator elements or in that the stator element is at least substantially missing.

10. The linear motor system in accordance with claim 1, wherein
the spacing between magnetic poles of two stator elements that are each arranged next to the at least one selected stator element is approximately equal to the spacing of two magnetic poles in the magnetic element of the mover in the direction of movement of the mover.

11. The linear motor system in accordance with claim 4, wherein
the control device is configured to compensate by way of a forward control the holding force that the at least one selected stator element exerts on the mover.

12. The linear motor system in accordance with claim 1, wherein
the linear motor system is a linear motor system having a longitudinal magnetic flux in which the magnetic flux of the stator elements substantially extends in the direction of movement of the mover.

13. The linear motor system in accordance with claim 1, wherein
the linear motor system is a linear motor system having a longitudinal magnetic flux in which the magnetic flux of the stator elements substantially extends in the direction of movement of the mover.

14. The linear motor system in accordance with claim 1, wherein
the at least one selected stator element changes between the first and second states in that magnetic connections between a magnetically insulatable stator element and stator elements adjacent at both sides are interrupted.

15. The linear motor system in accordance with claim 1, wherein
the at least one selected stator element is configured to change between the first and second states in that permanent magnets are arranged and/or electromagnets can be activated between a magnetically insulatable selected stator element and stator elements adjacent at both sides.

* * * * *